United States Patent
Arberg et al.

(10) Patent No.: US 9,509,590 B2
(45) Date of Patent: *Nov. 29, 2016

(54) METHOD AND APPARATUS FOR PROVIDING RESILIENCY IN MULTICAST NETWORKS

(71) Applicant: ERICSSON AB, Stockholm (SE)

(72) Inventors: Peter Arberg, Hojbjerg (DK); Ramanathan Lakshmikanthan, Santa Clara, CA (US); Ferry Sutanto, San Jose, CA (US)

(73) Assignee: ERICSSON AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/922,083

(22) Filed: Oct. 23, 2015

(65) Prior Publication Data

US 2016/0043936 A1 Feb. 11, 2016

Related U.S. Application Data (63) Continuation of application No. 14/017,097, filed on Sep. 3, 2013, now Pat. No. 9,203,736, which is a continuation of application No. 12/060,098, filed on Mar. 31, 2008, now Pat. No. 8,526,300.

(51) Int. Cl.
*G06F 11/00* (2006.01)
*H04L 12/761* (2013.01)
(Continued)

(52) U.S. Cl.
CPC ............ *H04L 45/16* (2013.01); *H04L 12/185* (2013.01); *H04L 12/1863* (2013.01); *H04L 41/0654* (2013.01); *H04L 45/12* (2013.01); *H04L 45/28* (2013.01)

(58) Field of Classification Search
CPC .. H04L 12/185; H04L 12/1863; H04L 45/12; H04L 45/30
USPC .................................................. 370/225, 390
See application file for complete search history.

(56) References Cited

U.S. PATENT DOCUMENTS 5,671,215 A 9/1997 Foglar
6,542,934 B1 * 4/2003 Bader ................. G06F 11/2007
                                                         709/237

(Continued)

OTHER PUBLICATIONS

Redback Networks Inc., "Routing Protocols Configuration Guide," Smart Edge OS, Release 6.1.1, 1998-2007, pp. 1-102.

(Continued)

*Primary Examiner* — Dang Ton
*Assistant Examiner* — Ryan Kavleski
(74) *Attorney, Agent, or Firm* — Nicholson De Vos Webster & Elliott LLP (57) ABSTRACT

Techniques for minimizing packet loss of multicast traffic stream when a failure occurs are described herein. In one embodiment of the invention, a network element separately joins a multicast group through a first and second path respectively. During uninterrupted operation, the network element processes the packets of the multicast traffic stream it receives through the first path and drops the packets of the equivalent multicast traffic stream it receives through the second path. Upon an interruption of the packets of the multicast traffic stream being received through the first path, the network element transitions to processing the packets of the equivalent multicast traffic stream it receives through the second path. Other methods and apparatuses are also described.

21 Claims, 4 Drawing Sheets

(51) Int. Cl.
  *H04L 12/18* (2006.01)
  *H04L 12/721* (2013.01)
  *H04L 12/24* (2006.01)
  *H04L 12/703* (2013.01)

(56) References Cited

U.S. PATENT DOCUMENTS

| | | |
|---|---|---|
| 6,697,373 B1 | 2/2004 | Sandstrom |
| 6,895,024 B1 | 5/2005 | Drake et al. |
| 7,075,932 B2 | 7/2006 | Matsuhira et al. |
| 2001/0037472 A1 | 11/2001 | Li |
| 2003/0142670 A1 | 7/2003 | Gould et al. |
| 2004/0250173 A1 | 12/2004 | Jiang et al. |
| 2006/0120279 A1 | 6/2006 | Mitsumori |
| 2006/0182049 A1 | 8/2006 | Rokui |
| 2007/0101379 A1 | 5/2007 | Pereira |
| 2007/0299973 A1 | 12/2007 | Borgendale et al. |
| 2008/0095161 A1 | 4/2008 | Xu |
| 2008/0225698 A1 | 9/2008 | Smith et al. |
| 2008/0267078 A1 | 10/2008 | Farinacci et al. |
| 2009/0201803 A1 | 8/2009 | Filsfils et al. |

OTHER PUBLICATIONS

B. Fenner et al., "Protocol Independent Multicast—Sparse Mode (PIM-SM) : Protocol Specification (Revised)," RFC No. 4601, Aug. 2006, pp. 1-134.

A. Adams et al., "Protocol Independent Multicast—Dense Mode (PIM-DM) : Protocol Specification (Revised)," RFC No. 3973, Jan. 2005, pp. 1-55.

S. Bhattacharyya, "An Overview of Source-Specific Multicast (SSM)," RFC No. 3569, Jul. 2003, pp. 1-13.

S. Deering, "Host Extensions for IP Multicasting," RFC No. 1112, Aug. 1989, pp. 1-16.

W. Fenner, "Internet Group Management Protocol, Version 2," Network Working Group, RFC No. 2236, Nov. 1997, pp. 1-17.

B. Cain et al., "Internet Group Management Protocol, Version 3," Network Working Group, RFC No. 3376, Oct. 2002, pp. 1-48.

P. Pan et al., "Fast Reroute Extensions to RSVP-TE for LSP Tunnels," Network Working Group, RFC No. 4090, May 2005, pp. 1-34.

\* cited by examiner

METHOD AND APPARATUS FOR PROVIDING RESILIENCY IN MULTICAST NETWORKS

CROSS-REFERENCE TO RELATED APPLICATIONS

This application is a continuation of application Ser. No. 14/017,097, filed Sep. 3, 2013, which is a continuation of U.S. application Ser. No. 12/060,098, filed Mar. 31, 2008, issued as U.S. Pat. No. 8,526,300 on Sep. 3, 2013, which are hereby incorporated by reference.

BACKGROUND

1. Field

Embodiments of the invention relate to the field of networking; and more specifically, to multicast traffic processing.

2. Background

Multicast routing allows a source to send packets (e.g., a multicast traffic stream) to any number of destinations. Thus, multicast routing is a one-to-any routing scheme. The destinations decide whether to join the multicast traffic stream. Thus, the source may communicate with more than one destination within a network without the source separately addressing traffic to each destination on the network that joined the multicast traffic stream.

Protocol Independent Multicast (PIM) is a multicast routing protocol that runs over existing unicast (one-to-one routing scheme) architectures. There are several variants of PIM routing protocols (e.g., PIM Sparse Mode (defined in Request for Comments (RFC) 4601, August 2006), PIM Dense Mode (defined in RFC 3973, January 2005), and PIM Source Specific Mode (defined in RFC 3569, July 2003)). In each variant, PIM makes use of a unicast routing protocol to populate routing tables and uses those tables during multicast processing. For example, a unicast routing protocol typically determines a best route towards the multicast traffic source and PIM uses this route. PIM also relies on the Internet Group Management Protocol (IGMP) (defined in RFC 1112, RFC 2236, and RFC 3376) to provide the multicast group membership information. IGMP is typically used by the local multicast receivers (or local customer premise equipment) that desire to join a multicast traffic stream.

In a typical prior art technique implementing PIM, multicast traffic is received at a single interface of a network element that joined the multicast traffic (e.g., the interface chosen by the unicast routing protocol as having the best route towards the multicast traffic source). For example, in an IP multicasting prior art technique the multicast traffic is received on one IP interface of a network element that joined the multicast traffic as chosen by the unicast routing protocol operating on that network element (e.g., Interior Gateway Protocol (IGP)).

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

The techniques shown in the figures can be implemented using code and data stored and executed on one or more electronic devices (e.g., a computer, a network element, etc.). As used herein, a network element (e.g., a router, switch, bridge, etc.) is a piece of networking equipment, including hardware and software that communicatively interconnects other equipment on the network (e.g., computing end stations (e.g., a desktop computer, a laptop computer, a mobile device, etc.), other network elements, etc.) Such electronic devices store and communicate (internally and with other electronic devices over a network) code and data using machine-readable media, such as machine storage media (e.g., magnetic disks; optical disks; random access memory; read only memory; flash memory devices) and machine communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

Some network elements support the configuration of multiple contexts. As used herein, each context is an instance of a virtual network element (e.g., virtual router or a virtual bridge). Each context typically shares one or more computing resources (e.g., memory, processing cycles, line card(s), etc.) with other contexts configured on the network element, yet is independently administrable. For example, in the case of multiple virtual routers, each of the virtual routers shares computing resources, but is separate from those other virtual routers regarding its management domain, authentication, authorization, and accounting (AAA) name space, IP address, and routing database(es). By this separation, service providers may employ multiple contexts to provide direct network access for customers and/or provide different classes and/or types of services for customers.

Within a network element, multiple interfaces may be configured. As used herein, each interface is a logical entity, typically configured as part of a context, which provides higher-layer protocol and service information (e.g., Layer 3 addressing) and is independent of physical ports and circuits. AAA may be provided for through an internal or external AAA server (e.g., RADIUS (Remote Authentication Dial-In User Service), Diameter, etc.). The AAA server provides subscriber records for subscribers (e.g., end users of the service(s)) that identify, among other subscriber configuration requirements (e.g., authentication, access control, rate-limiting, policing information), to which interface and which context (e.g., which of the virtual network elements) the corresponding subscribers should be bound within the network element. As used herein, a binding forms an association between a physical entity (e.g., port, channel, etc.) or a logical entity (e.g., interface, virtual circuit, etc.) with a higher-layer protocol interface over which network protocols (e.g., routing protocols, bridging protocols) are configured for a given context. Subscriber data flows on the physical entity when some higher-layer protocol interface is configured and associated with that physical entity. By way of a summary example, AAA processing is performed to identify the subscriber record for a subscriber, that subscriber record identifies one or more virtual routers in the network element to which that subscriber's traffic should be bound, and the physical entity carrying that subscriber's traffic (e.g., the circuit) is bound to an interface of that virtual router.

A method and apparatus for resilient multicast traffic processing of a network element is described. In one embodiment of the invention, a network element separately joins equivalent multicast traffic streams at a first and second interface respectively. During uninterrupted operation, the network element processes the packets of the multicast traffic stream it receives at the first interface and drops the packets of the equivalent multicast traffic stream it receives at the second interface. Upon an interruption of the packets of the multicast traffic stream being received at the first interface, the network element transitions to processing the packets of the equivalent multicast traffic stream it receives at the second interface. In some embodiments of the invention, upon the network element transitioning to processing the packets it receives at the second interface, a third interface is configured with a best route towards the source of the multicast traffic stream. The network element joins an equivalent multicast traffic stream at the third interface and classifies the third interface as an outgoing interface. Upon the network element receiving packets of the multicast traffic stream at the third interface, the network element transitions to processing the packets of the multicast traffic stream it receives at the third interface and drops the packets of the equivalent multicast traffic stream it receives at the second interface. According to one embodiment of the invention, the first and third interface are the same interface.

Figure 1A:
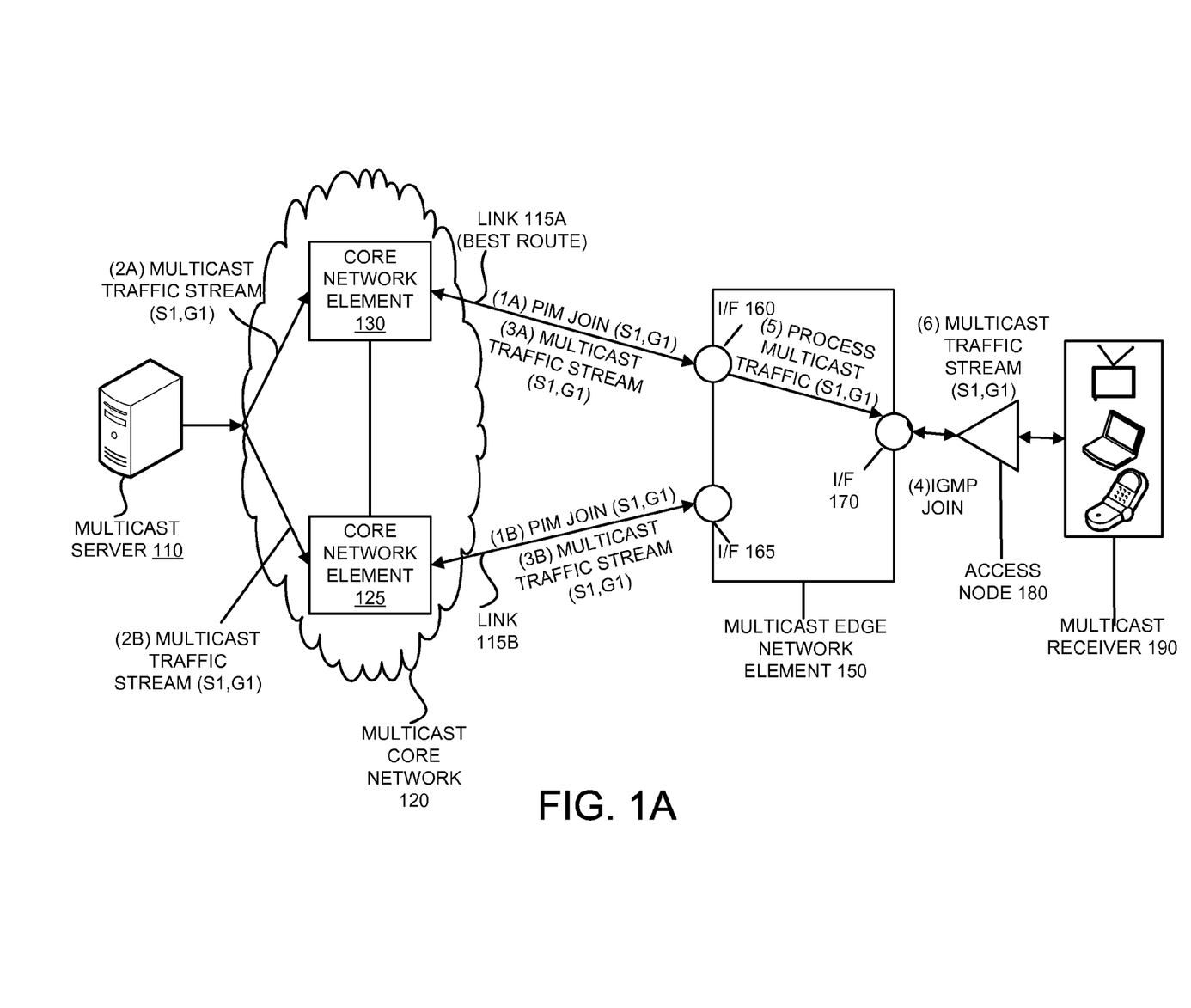
FIG. 1A illustrates an exemplary data flow diagram for providing resiliency of multicast traffic in a multicast routing network without convergence of a unicast routing protocol according to one embodiment of the invention.

FIG. 1A illustrates an exemplary multicast routing network according to one embodiment of the invention. The multicast server 110 is providing multicast traffic. That is, the multicast server 110 is the source of the multicast traffic. It should be understood that the multicast server 110 need not be the creator of the multicast traffic. For example, the multicast server 110 may be a Rendezvous Point (RP) that serves as a distribution point for the multicast traffic. The multicast server 110 is coupled with the multicast core network elements 125 and 130 respectively through a multicast core network 120. The multicast core network elements 125 and 130 are intermediate computing devices in the multicast network (e.g., router, bridge, switch, etc.). The multicast core network elements 125 and 130 are multicast enabled (i.e., they are capable of forwarding multicast traffic). Of course, it should be understood that the multicast core may include additional multicast core network elements, including ones between the multicast server 110 and the multicast core network elements 125 and/or 130 and ones between the multicast core network elements 125 and/or 130 and the multicast edge network element 150.

Coupled with the multicast core network elements 130 and 125 is the multicast edge network element 150. According to one embodiment of the invention the multicast core network elements 130 and 125 and the multicast edge network element 150 are each routers. The multicast edge network element 150 is outside of the multicast core network 120 (e.g., the multicast edge network element 150 is a last hop network element for the multicast traffic for the multicast receiver 190, thus the multicast edge network element 150 is at the edge of the multicast enabled network). The multicast edge network element 150 communicatively interconnects the multicast core network 120 with the multicast receiver 190 through the access node 180. Included within the multicast edge network element 150 are interfaces 160, 165, and 170. According to one embodiment of the invention, the interfaces 160 and 165 are Reverse Path Forwarding (RPF) interfaces. The interface 160 is coupled with the multicast core network element 130 over the communication link 115A. The interface 165 is coupled with the multicast core network element 125 over the communication link 115B. The interface 170 is coupled with the access node 180. According to one embodiment of the invention, the access node 180 terminates the connections of subscribers (e.g., users of computing end stations such as laptop computers, desktop computers, mobile devices). For example, the access node 180 is coupled with the multicast receiver 190. While in one embodiment of the invention the multicast receiver 190 is a computer, in alternative embodiments of the invention the multicast receiver 190 is a different electronic device (e.g., set top box, television, mobile device, home router, etc.). The multicast receiver 190 is the destination of the multicast stream.

FIG. 1A will be described with reference to the exemplary network element of FIG. 3. However, it should be understood that the operations of FIG. 1A can be performed by embodiments of the invention other than those discussed with reference to FIG. 3, and the embodiments discussed with reference to FIG. 3 can perform operations different than those discussed with reference to FIG. 1A.

Figure 3:
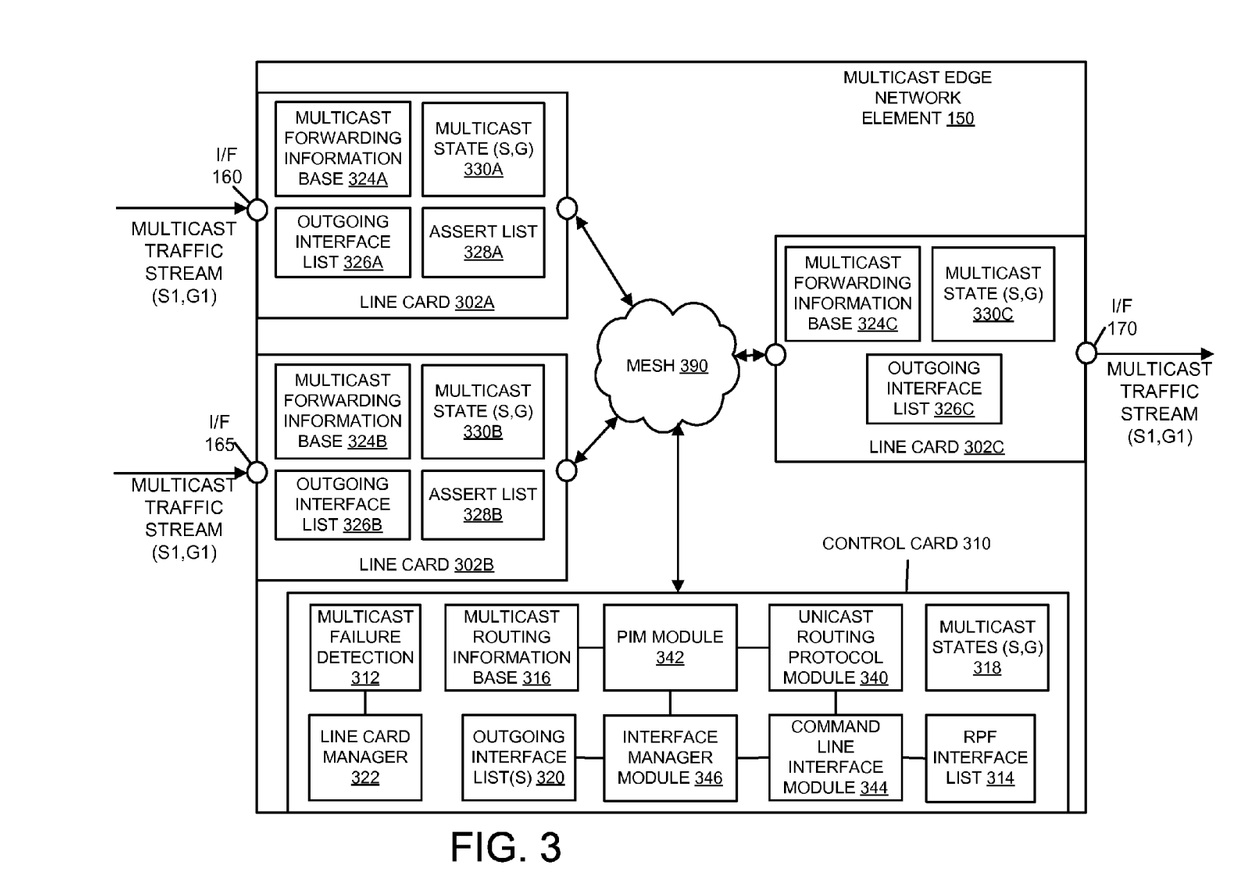
FIG. 3 illustrates an exemplary network element configured for resilient multicast traffic processing according to one embodiment of the invention.

FIG. 3 illustrates an exemplary network element configured for resilient multicast traffic processing according to one embodiment of the invention. Included within the multicast edge network element 150 are the control card 310 (of which there may be more than one of, but one is shown for simplicity) and the line cards 302A-C. For the multicast traffic stream of the example in FIG. 1A, according to one embodiment of the invention the line cards 302A and 302B are ingress line cards and the line card 302C is an egress line card. Included within the control card 310 are multicast failure detection 312, a Reverse Path Forwarding (RPF) list 314, a multicast routing information base 316, multicast states 318, one or more outgoing interface lists 320, a line card manager 322, a unicast routing protocol module 340, a PIM module 342, a command line interface module 344, and an interface manager module 346. The control card 310 is coupled with the line cards 302A-C through a mesh 390. The line cards 302A-B include a multicast forwarding information base 324A-B, multicast state 330A-B, an outgoing interface list 326A-B, and an assert list 328A-B respectively. Each of these will be discussed in greater detail below. Additionally, the line card 302C includes a multicast forwarding information base 324C, multicast state 330C, and an outgoing interface list 326C. Although not illustrated in FIG. 3 for simplicity purposes, it should be understood that each line card includes one or more physical ports which are the physical connectors and paths for the multicast traffic streams (ingress and egress). For example, the interface 160 and is bound to a port on the line card 302A, the interface 165 is bound to a port on the line card 302B, and the interface 170 is bound to a port on the line card 302C. It should be understood that the architecture of the multicast edge network element 150 is exemplary; thus other architectures are within the scope of the invention.

According to one embodiment of the invention the multicast edge network element 150 includes redundant uplink connections towards the multicast traffic source (e.g., the multicast server 110) as will be described in greater detail later herein. For example, referring to FIG. 1A, the communication link 115A (coupling the multicast core network element 130 and the interface 160) and the communication link 115B (coupling the multicast core network element 125 and the interface 165) each carry an equivalent multicast traffic stream. It should be noted that in a typical PIM architecture, a particular multicast traffic stream (e.g., S1,G1) is received on one interface of a network element that joined the multicast traffic stream (e.g., a unicast routing protocol operating on the network element configures a single interface with the best route towards the multicast traffic stream (S1,G1) source). For example, in a typical IP multicasting architecture, a particular multicast traffic stream is received on one IP interface of a network element that joined the multicast traffic stream as chosen by the unicast routing protocol (e.g., Interior Gateway Protocol (IGP)). According to one embodiment of the invention, the interface 160 and the interface 165 are on separate line cards to protect against line card failure. For example, referring to FIG. 3, the interface 160 is on the line card 302A and the interface 165 is on the line card 302B. According to one embodiment of the invention the interface 160 and the interface 165 are reverse path forwarding (RPF) interfaces.

An interface may either be a primary interface or a secondary interface according to one embodiment of the invention. There is only one primary interface and there may be one or more secondary interfaces (e.g., backup interfaces). In order to provide resiliency, there must be at least one primary interface and one secondary interface each receiving an equivalent multicast traffic stream. The multicast edge network element 150 processes the packets of the multicast traffic stream it receives on the primary interface and drops the packets of the equivalent multicast traffic stream it receives on the secondary interface. According to one embodiment of the invention, a unicast routing protocol determines which interface on the multicast edge network element 150 should be the primary interface. For example, the unicast routing protocol IGP determines the best route (e.g., which communication links and which interface) to the source multicast server 110. The interface that is associated with the best route is the primary interface. Referring to FIG. 1A, the interface 160 is the primary interface.

According to one embodiment of the invention, the secondary interface is chosen by a network administrator. Typically a network administrator knows of the available redundant communication links in the network. For example, referring to FIG. 1A, the network administrator typically knows that the multicast traffic may be received from the multicast core network element 125 and the multicast core network element 130. As such, the network administrator configures the network element (e.g., through a command line interface) with a secondary interface. For example referring to FIG. 1A, the interface 165 has been configured as the secondary interface. In order to protect against a network administrator's error in selecting a secondary interface, according to one embodiment of the invention the network administrator configures at least two interfaces as possible secondary interfaces. In case one of the possible secondary interfaces is actually the primary interface, another possibility for the secondary interface exists. In one embodiment of the invention, the implementation assists with the coupling of the secondary interface with a different multicast core network element than the primary interface. Thus, if the network administrator selects an interface to be a secondary interface that is coupled with the same multicast core network element that is coupled with the primary interface, the multicast edge network element alerts the network administrator of the error and allows the network administrator to select a different interface. Additionally, the network administrator may configure additional possibilities for the secondary interface in case of the secondary interface failing (e.g., a line card failure, a communication link failure, etc.). Additionally and/or alternatively, the network administrator may be notified if the secondary interface fails while the primary interface is working.

According to another embodiment of the invention, the secondary interface is chosen by the unicast routing protocol in a similar fashion as the primary interface. For example, the secondary interface may be associated with the second best route towards the source. For example, referring to FIG. 1A, the interface 165 is associated with the second best route towards the multicast source (e.g., through the multicast core network element 125 towards the multicast server 110). Additionally, the unicast routing protocol may also determine additional possibilities for the secondary interface in case of the secondary interface failing (e.g., a line card failure).

Referring to FIG. 3, the secondary interfaces that are either configured by the network administrator or determined by a unicast routing protocol are stored in the RPF interface list 314 according to one embodiment of the invention. Additionally, the line card manager 322 monitors the line cards and switches the interface states from primary to secondary if the primary interface is no longer active.

Referring back to FIG. 1A, the multicast edge network element 150 attempts to separately join the equivalent multicast streams at the primary interface and at the secondary interface respectively. For example, at an operation 1A and 1B, a PIM Join for a particular source and group (e.g., (S1, G1)) is transmitted from the interface 160 to the multicast core network element 130 and a second PIM join is transmitted from the interface 165 to the multicast core network element 125 according to one embodiment of the invention. As the PIM join messages traverse the network (e.g., hop by hop) a shortest path tree (SPT) is created in the multicast network element 150. Assuming the joining of the multicast traffic streams was successful, at an operation 2A and 2B the equivalent multicast traffic streams (e.g., (S1, G1)) begins flowing to the multicast core network element 130 and the multicast core network element 125 respectively. The multicast core network element 130 and the multicast core network element 125 forward the equivalent multicast traffic stream (e.g., (S1, G1)) to the interface 160 and the interface 165 of the multicast edge network element 150 respectively. Thus, during normal operation, equivalent multicast traffic streams are received at the interface 160 and the interface 165 of the multicast edge network element 150. Thus, unlike in a typical multicast architecture where a particular multicast traffic stream (e.g., S1, G1) is received on one interface of a network element, the particular multicast traffic stream (e.g., S1,G1) is received at two interfaces of the network element. It should be understood that in some embodiments of the invention the multicast traffic stream is already being received at the primary interface at the time the secondary interface is configured. Thus, a duplicative multicast traffic stream is received at the multicast edge network element 150. In some cases a duplicative multicast traffic stream is transmitted through the multicast network (e.g., the multicast core network element 125 would not join the multicast traffic stream (e.g., S1, G1) if not for the multicast edge network element 150 joining the stream through interface 165). However, in other cases, certain ones of the multicast core network elements (e.g., multicast core network element 125) already are receiving the multicast traffic stream (e.g., S1, G1) for a different destination (e.g., the multicast core network 125 already receives the multicast traffic stream (e.g., S1, G1) and transmits this stream to a different multicast edge network element not shown in FIGS. 1A, 1B, and 2). Thus in these cases, the amount of duplication of multicast traffic in the network is less.

According to one embodiment of the invention, the first packet from the multicast traffic stream received on the interface 165 is checked to determine whether the traffic stream is carrying the correct traffic. If the multicast traffic stream is not carrying the correct traffic, according to one embodiment of the invention a different secondary interface is chosen and a PIM Join message is sent from that interface (i.e., that different secondary interface joins the multicast traffic stream). If the RPF interface list 314 is configured with multiple entries, the RPF interface list 314 may be used to select another interface.

Referring to FIG. 3, the multicast routing information base 316 is populated with multicast route information received from the two PIM Join messages. For example, the multicast routing information base 316 includes the multicast traffic trees (e.g., the SPT trees) that are determined by the two PIM Join messages traversing the network. The multicast routing information base 316 populates the multicast forwarding information base 324A and 324B with information specific for the line cards 302A and 302B respectively. It should be understood that a similar multicast traffic tree (e.g., SPT tree) for a particular source and group (e.g., (S1,G1)) is populated to the forwarding information base 324A and 324B.

Sometime later, at an operation 4, the multicast receiver 190 indicates that it wishes to receive the multicast traffic stream. According to one embodiment of the invention, an IGMP Join message (e.g., IGMPv2 or IGMPv3) is sent either by the multicast receiver 190 or from the access node 180 depending on if the access node 180 is configured in IGMP Proxy mode or IGMP Snooping mode. Referring to FIG. 3, the multicast states (S,G) 318 include the sources and groups for which the multicast edge network element 150 supports. For example, referring back to FIG. 1A, the multicast edge network element 150 supports the source (S1,G1). A subset of the multicast states (S,G) 318 is downloaded to the line cards 302A and 302B depending on which source and group the line cards supports (multicast state (S,G) 330A and 330B respectively).

Upon receiving the IGMP join message, since the interface 160 was selected as the primary interface, during operation 5, the multicast edge network element processes the packets of the multicast traffic stream it receives at the interface 160 and forwards the packets towards the destination (e.g., the multicast receiver 190). In addition, the multicast edge network element 150 drops the packets of the equivalent multicast traffic stream it receives at the interface 165. Referring to FIG. 3, the multicast traffic stream is forwarded to the interface according to the outgoing interface list 326A. Thus, the multicast traffic stream is passed through the mesh 390 on route to the line card 302C. According to one embodiment of the invention, upon leaving the line card 302A, the multicast traffic stream is associated with an adjacency that corresponds to the multicast state (e.g., S1, G1). This received information is stored in the multicast state (S, G) 330C. Upon the multicast traffic stream arriving at the line card 302C, the line card 302C uses the outgoing interface list 326C to send the multicast traffic stream to all interested clients or ports. In our example, the multicast traffic stream is forwarded out the interface 170 according to the outgoing interface list 326C. At operation 6 the multicast traffic stream (e.g., (S1, G1)) is delivered to the multicast receiver 190 through the access node 180. Thus, during uninterrupted operation, the multicast edge network element processes the packets of the multicast traffic stream it receives on its primary interface and drops the packets of the equivalent multicast traffic stream it receives on its secondary interface.

Figure 1B:
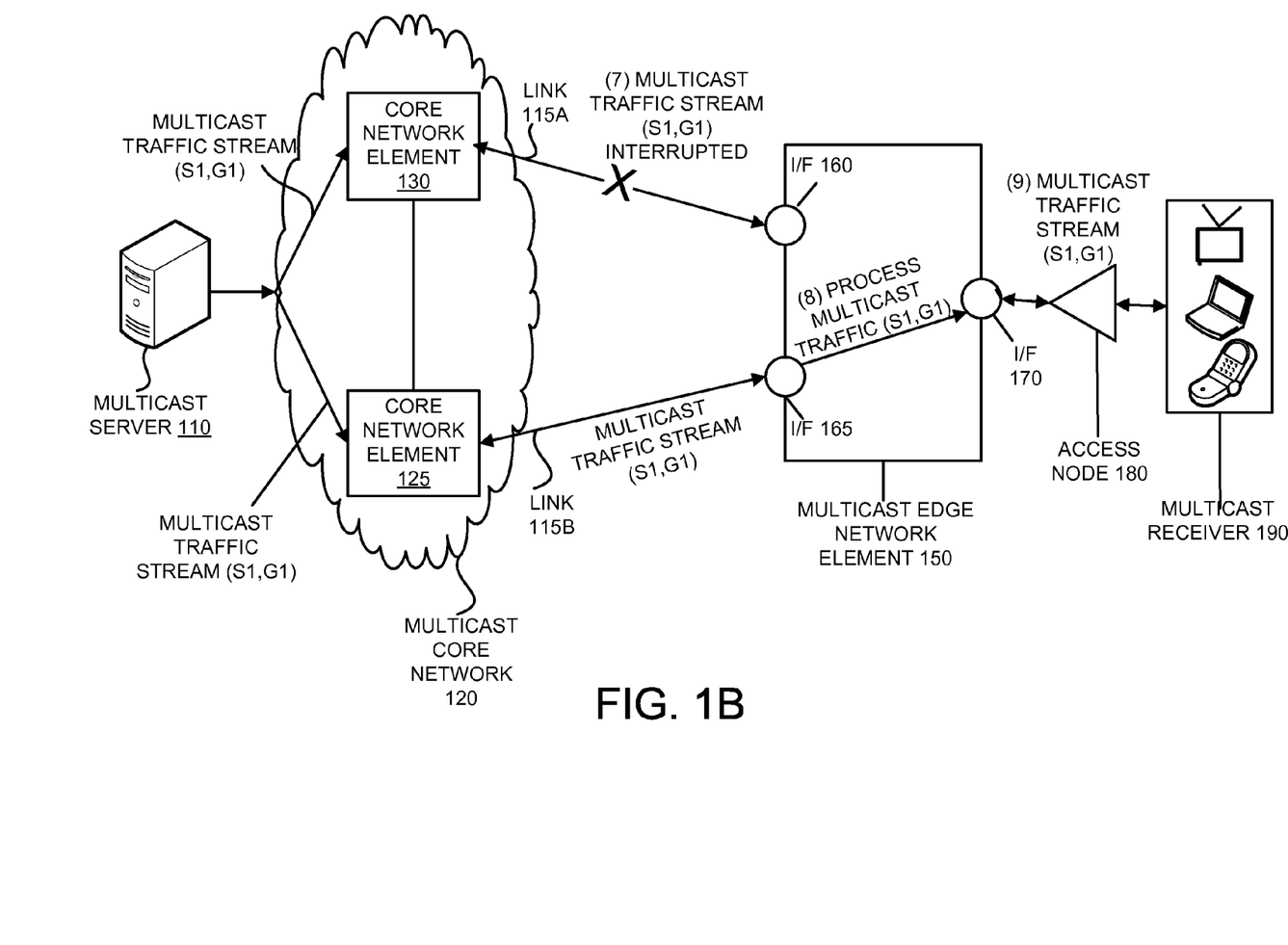
FIG. 1B illustrates the exemplary multicast routing network of FIG. 1A where multicast traffic has been interrupted according to one embodiment of the invention.

FIG. 1B illustrates the exemplary multicast routing network of FIG. 1A where multicast traffic has been interrupted according to one embodiment of the invention. FIG. 1B will be described with reference to the exemplary network element of FIG. 3. However, it should be understood that the operations of FIG. 1B can be performed by embodiments of the invention other than those discussed with reference to FIG. 3, and the embodiments discussed with reference to FIG. 3 can perform operations different than those discussed with reference to FIG. 1B.

Sometime later, at operation 7, the multicast traffic stream (e.g., S1, G1) is interrupted on the communication link 115A. The interruption may be caused by numerous factors (e.g., physical communication link failure, the multicast core network element 130 failure, the interface 160 failure, a line card hosting the interface 160 failing, etc.).

According to one embodiment of the invention, the multicast failure detection module 312 detects the interruption of the multicast traffic stream and informs the line card manager 322 of the failure. For example, the multicast failure detection module 312 detects that the multicast traffic stream (e.g., S1, G1) carried on the communication link 115A has been interrupted. The multicast failure detection module 312 may detect the failure in a number of ways. For example, the multicast failure detection module 312 may detect the failure via a communication link failure notification mechanism (e.g., Loss of Signal, Bidirectional Forwarding Decision (BFD) communication link failure notification, continuity check messages (CCM), etc.) or a drop in the rate of receipt of multicast traffic below a configured threshold.

Upon learning of the failure, the line card manager 322 configures the secondary interface as the primary interface which causes the multicast edge network element 150 to transition to processing the packets of the equivalent multicast traffic stream it receives at the secondary interface. For example, upon detecting that the multicast traffic stream to the primary interface 160 is interrupted, the line card manager 322 causes a transition to processing the packets of the equivalent multicast traffic stream being received at the secondary interface 165. According to one embodiment of the invention, the line card manager 322 causes the multicast state (S,G) 330A for that multicast traffic stream (e.g., S1,G1) of the interface 160 to be modified from active to null, and the multicast state (S,G) 330B for the multicast traffic stream (e.g., S1,G1) of the interface 165 to be modified from null to active). Thus, at an operation 8, the multicast edge network element 150 processes packets of the multicast traffic stream it receives at the interface 165 and transmits those packets towards the outgoing interface 170 to be transmitted towards the destination (e.g., the multicast receiver 190). Referring to FIG. 3, the packets of multicast traffic stream being received are forwarded out the interface 170 according to the outgoing interface list 326C in a similar fashion as described with reference to operation 5 of FIG. 1A. At an operation 9 the multicast traffic stream (e.g., (S1, G1)) is delivered to the multicast receiver 190 through the access node 180. Thus, the multicast edge network element 150 provides resilient multicast traffic stream processing by transitioning to processing packets of an equivalent multicast traffic stream already being received by the multicast edge network element 150. It should be understood that the multicast edge network element 150 guarantees only the last hop of the multicast traffic stream towards the multicast receiver 190. Specifically, the multicast edge network element 150 can ensure that two different interfaces are used that are coupled to two different core network elements (e.g., node disjointness), however, the disjointness of the remainder of the two paths traveled by the two multicast streams may vary. Thus, the approach protects against a failure of the line cards 302A-B, the communication links 115A-B, the multicast core network elements 125 and 130, but not necessarily failures of other core network elements in the routes between the multicast source and the multicast core network elements 125 and 130. For example, the multicast edge network element 150 does not guarantee that the multicast traffic stream is reaches the multicast core network elements 125 and 130.

Advantageously, as compared with a typical multicast architecture, the amount of time the multicast traffic stream is interrupted is comparatively smaller. For example, in a typical PIM multicast architecture scheme (where a particular multicast traffic stream is received at a single interface of a network element), upon an interruption of that multicast traffic stream the unicast routing protocol (e.g., IGP) must select a new interface to receive the multicast traffic stream (i.e., the unicast routing protocol must determine a new best route towards the source of the multicast traffic stream). However, the amount of time necessary for the unicast routing protocol to select a new interface depends on the amount of time of convergence of that unicast routing protocol (i.e., the amount of time necessary for that network element and other network elements in the network to agree on the best route). In addition, after the unicast routing protocol converges and a new interface is selected, the network element must join the multicast traffic stream at the new interface (e.g., a PIM join message must be sent out on the newly selected interface). Only when the new interface has joined the multicast traffic stream will the multicast traffic stream be resumed to the network element. Thus, in a typical PIM multicast architecture scheme, the amount of time that the multicast traffic stream is interrupted depends on the amount of time to detect the interruption, plus the amount of time for the unicast routing protocol to converge and select a new interface, plus the amount of time for the new interface to join the multicast traffic stream. Even with using advanced convergence techniques, typically the interruption time is several seconds, which is an unacceptable delay for certain multicast services (e.g., multicast based IPTV services).

However, since transitioning to processing packets of an equivalent multicast traffic stream is a local decision for the multicast edge network element 150, the amount of time that the multicast traffic stream is interrupted is dependent upon the amount of time to detect the interruption plus the amount of time to locally transition to processing packets of the equivalent multicast traffic stream the multicast edge network element 150 is already receiving. As the multicast traffic stream continues to be received at the network element (via the secondary interface), the network interface does not need to wait for a unicast routing protocol to converge, and does not need to join the multicast traffic before resuming the multicast traffic stream towards the receiver. As such, the amount of time the multicast traffic stream is interrupted is only for a short period of time, (e.g., less than 50 msec), which is acceptable even for multicast services with strict networking requirements including multicast based IPTV services.

Additionally, protecting a multicast traffic stream with a redundant multicast traffic stream received at a secondary interface is less complex to configure than a recovery technique using Multiprotocol Label Switching (MPLS) Fast Reroute (FRR) (defined in RFC 4090, May 2005). Although MPLS FRR is a local recovery with an interruption time typically less than 50 msec, it is more complicated to configure and computationally more expensive to maintain. For example, Resource Reservation Protocol (RSVP) must be running in the network in order to use MPLS FRR. In addition, a network administrator must make sure that FRR is configured on each node (e.g., the label switched paths (LSP), the backup LSPs, tunnels, etc.), and this requires installing the LSP in every network element along the two routes to the multicast server (i.e., the network administrator must configure a primary path to the source and a backup path to the source). Thus, the network administrator must configure two paths. In contrast, in certain embodiments of the invention, a network administrator only has to define an interface to act as a secondary interface in the multicast edge network element 150 (e.g., interface 165) where that interface is coupled to a different multicast core network element (e.g., multicast core network element 125) than is chosen by the unicast routing protocol (e.g., multicast core network element 130). In addition, in some embodiments of the invention, the multicast edge network element 150 assists the administrator through notification if the administrator selects an interface that is coupled to the same multicast core network element as chosen by the unicast routing protocol (e.g., multicast core network element 130). Thus, in these embodiments of the invention, the administrator configures the last hop of the equivalent multicast traffic stream to the multicast edge network element 150 (e.g., the backup multicast traffic stream), and the multicast core network element providing that last hop (e.g., multicast core network element 125) uses its unicast routing protocol to determine the rest of the path towards the source. Thus, in certain embodiments of the invention, the network administrator effectively selects a single hop (e.g., the last hop from a multicast core network element to the multicast edge network element 150) and the rest of the path is determined by that multicast core network element. According to another embodiment of the invention, the network administrator does not have to define an interface to act as a secondary interface as the secondary interface is chosen by a unicast routing protocol. However, in some embodiments of the invention where the secondary interface is chosen by a unicast routing protocol, the criteria for selection of the secondary interface includes node disjointness of at least the last hop (e.g., comparisons of alternate hops from the multicast edge network element 150 are made until one is located that is node disjoint from the multicast core network element of the primary interface.

Thus, in some embodiments of the invention the implementation of multicast resiliency in the multicast edge network element 150 guarantees resilient multicast traffic stream processing of only the last hop of multicast traffic. Since, as previously described, the implementation of multicast resiliency of the multicast edge network element 150 can ensure that two different interfaces are used that are coupled to two different multicast core network elements (e.g., multicast core network elements 125 and 130), the multicast edge network element 150 guarantees only node disjointness of the last hop in the route to the source of the multicast traffic (e.g., the multicast server 110). In other words, the multicast edge network element 150 guarantees only that two separate but equivalent multicast traffic streams may be received from two different multicast core network elements. However, the multicast edge network element 150 does not guarantee any level of disjointness beyond that last hop. For example, the route taken to the source by the multicast core network elements 125 and 130 may be the same, or it may differ at some and/or all points in the route (i.e., the route chosen by the multicast core network elements 125 is independent (both node and link disjoint) from the route chosen by the multicast core network element 130). At some point, these two routes will converge (at least at the source, but in some cases it will be likely that the routes will converge prior to the reaching the source). If a failure occurs before the last hop (e.g., a pre-last hop failure), the multicast edge network element 150 does not guarantee that either of the multicast streams (e.g., from the multicast core network elements 125 or 130) can be received. In other words, if a pre-last hop failure affects the equivalent multicast traffic streams received at both of the multicast core network elements 125 and 130, the multicast edge network element 150 will not receive either of those multicast traffic streams. However, if a pre-last hop failure affects only one of the equivalent multicast traffic streams, the multicast edge network element 150 continues to receive the other non-affected equivalent multicast traffic stream. Of course, it should be understood that if the failure occurs at the source of the multicast traffic (e.g., the multicast server 110 failing) the multicast edge network element 150 does not receive the multicast traffic streams from either multicast core network element 125 and 130. Thus, there is a chance that the implementation of resilient multicast traffic processing of the multicast edge network element 150 protects multicast traffic stream processing of more than the last hop (e.g., if hops other than the last hop are node and/or link disjointed), however the implementation of multicast traffic resiliency in multicast edge network element 150 guarantees resilient multicast traffic stream processing of only the last hop.

Figure 2:
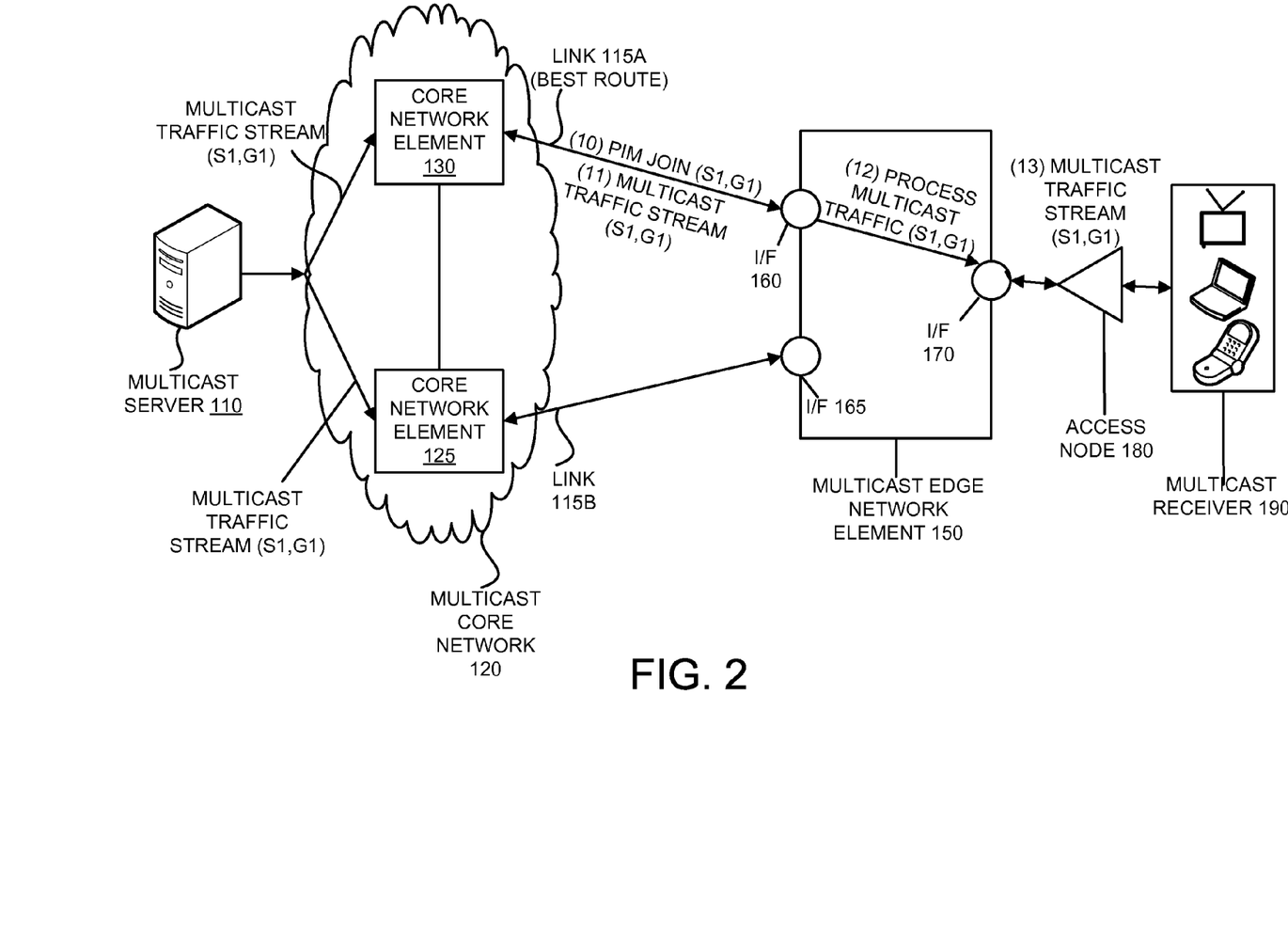
FIG. 2 illustrates the exemplary multicast routing network of FIG. 1B where multicast traffic has been resumed according to one embodiment of the invention.

FIG. 2 illustrates the exemplary multicast routing network of FIG. 1B where multicast traffic has been resumed according to one embodiment of the invention. FIG. 2 will be described with reference to the exemplary network element of FIG. 3. However, it should be understood that the operations of FIG. 2 can be performed by embodiments of the invention other than those discussed with reference to FIG. 3, and the embodiments discussed with reference to FIG. 3 can perform operations different than those discussed with reference to FIG. 2.

As was discussed previously, the primary interface is typically the interface that has the best route (e.g., shortest route) to the source of the multicast traffic as determined by a unicast routing protocol (e.g., IGP). The secondary interface may be chosen by the network administrator and may not be the second best route to the source of the multicast traffic. Thus, when the primary interface is not active (i.e., is not receiving the multicast traffic), according to one embodiment of the invention the unicast routing protocol is run and converges with a new interface to find the best route to the source of the multicast traffic. While in one embodiment of the invention the unicast routing protocol converges with a new interface upon detecting that the multicast traffic stream is interrupted towards the first interface, in alternative embodiments of the invention the unicast routing protocol is not run until the first interface is back up (if there was a failure of the first interface). For example, it is possible that the interruption that caused the switchover has ended and the primary interface may be used again. Referring to FIG. 2, the interruption that caused the switchover has been removed and the communication link 115A coupling the interface 160 and the multicast core network element 130 is not being interrupted. The unicast routing protocol determines that the interface 160 is the best route towards the source of the multicast traffic (e.g., multicast server 110).

After determining that the interface 160 is the best route towards the source of the multicast traffic, the interface 160 is classified as an outgoing interface (e.g., the interface 160 is added onto the outgoing interface list 326A). Additionally, at an operation 10, the interface 160 joins the multicast traffic stream (e.g., by transmitting a PIM Join message to the multicast core network element 130). As the join messages traverse the network (e.g., hop by hop) a shortest path tree (SPT) is created. Assuming the joining of the multicast traffic stream is successful, at an operation 11 the multicast traffic stream (e.g., (S1, G1)) begins flowing to the multicast core network element 125 over the communication link 115A. Note that an equivalent multicast traffic stream is still flowing to the interface 165.

According to one embodiment of the invention, upon packets of the multicast traffic stream arriving at the network element on an interface classified as an outgoing interface, an assert is triggered. For example, referring to FIG. 3, the assert list 328A contains the possible asserts for the line card 302A. According to one embodiment of the invention, when a primary interface is added to the outgoing interface list and packets of the multicast traffic stream is being received on that primary interface, an assert is triggered that alerts the network element that packets of the multicast traffic stream have been received at the primary interface. Accordingly, the multicast edge network element transitions to processing the packets of the multicast traffic stream it receives at this primary interface and removes the primary interface from the outgoing interface list. It should be understood that although the primary interface is added to the outgoing interface list, the multicast traffic is not forwarded according to that outgoing interface list (i.e., multicast traffic is not forwarded or processed). Furthermore, a PIM Prune message as known in the art is not sent out on the primary interface upon receiving multicast traffic. Rather, the primary interface is added to the outgoing interface list to trigger the assert message which signals the presence of multicast traffic at the primary interface.

Thus, referring to FIG. 2, at an operation 11 packets of the multicast traffic stream are received at the interface 160, which is on the outgoing interface list 326A. An assert is triggered which signals the line card manager 322 to cause multicast edge network element 150 to process the packets of the multicast traffic stream it receives on the interface 160 and the packets of the equivalent multicast traffic stream it receives on the interface 165 to be dropped (e.g., the multicast state (S,G) 330A for that multicast traffic stream (e.g., S1,G1) of the interface 160 is modified from null to active, and the multicast state (S,G) 330B for that multicast traffic stream (e.g., S1,G1) of the interface 165 is modified from active to null).

After the assert is triggered and the multicast state (S,G) 330A of the interface 160 is modified from null to active, at an operation 12, the multicast edge network element 150 transitions to processing packets of the multicast traffic stream (e.g., S1,G1) it receives on the interface 160 and drops the packets of the equivalent multicast traffic stream it receives on the interface 165. At an operation 13 the multicast traffic stream (e.g., (S1, G1)) is delivered to the multicast receiver 190 through the access node 180.

It should be understood that although in FIG. 2 the original interface 160 was chosen as the new interface, in other embodiments of the invention a new different interface may be chosen as the new interface by the unicast routing protocol. For example, the communication link 115A may be inoperable so a different communication link and a different interface (not shown in FIG. 2) may be chosen as the new primary interface.

In addition, according to one embodiment of the invention, it is possible that the unicast routing protocol determines that the secondary interface, which is currently the active interface for processing of the multicast traffic stream, is the best route to the source of the multicast traffic stream. In this case there is no need for the secondary interface to transmit a join message to any network elements as they are already receiving the multicast traffic stream. Additionally, in one embodiment of the invention, the administrator is notified that a backup interface is not configured (e.g., a redundant multicast traffic stream is not being received at two interfaces). In one embodiment of the invention the multicast edge network element periodically runs the unicast routing protocol to determine the best route towards the multicast traffic stream.

Thus, referring to FIG. 2, the multicast edge network element 150 may transition from processing packets of the multicast traffic stream it receives on a secondary interface to processing packets of an equivalent multicast traffic stream on an interface chosen by the unicast routing protocol as having the best route towards the multicast source. As this transition is a local decision relative to the multicast edge network element 150, the amount of time of interruption (i.e., the amount of time when packets of the multicast traffic stream are not being processed) can be performed quickly (e.g., typically within 50 msec). Furthermore, as the transition occurs when packets of the multicast traffic stream have arrived on the new interface (i.e., the interface selected by the unicast routing protocol) the number of packets lost is close to zero. Thus, a minimal amount of packets may be lost before the multicast traffic stream is resumed to the end user (e.g., multicast receiver 190).

While embodiments of the invention have been described in relation to a network element configured for resilient multicast traffic processing being a last hop network element (e.g., a multicast edge network element), in alternative embodiment(s) of the invention the network element may be a different network element (e.g., a core network element). For example, in addition to or instead of the multicast edge network element providing resilient multicast traffic processing, in the network of FIGS. 1A-B and 2, in some embodiments of the invention one or both of the multicast core network elements 130 and 125 each could perform resilient multicast traffic processing in a similar manner as the multicast edge network element 150. Thus, in these embodiments of the invention, the implementation of resilient multicast traffic processing of the multicast core network elements guarantees multicast traffic stream processing of only a single upstream hop.

Additionally, while embodiments of the invention have described the number of redundant communication links to be two, in alternative embodiments of the invention there can be any number of redundant communication links.

While in some embodiments of the invention the multicast core network elements 125 and 130 are different multicast core network elements, in alternative embodiments of the invention the multicast core network elements 125 and 130 are the same multicast core network element (each with a different connection to the multicast edge network element 150). While if the multicast core network elements 125 and 130 are the same network element the multicast edge network element 150 is not protecting against the multicast core network element failing, the multicast edge network element 150 protects against interface failure and/or line card failure (if the primary and secondary interface are bound to different ports on different line cards).

According to one embodiment of the invention, the multicast edge network element includes one or more contexts. For example, according to one embodiment of the invention a context is configured for a certain service provider to provide multicast traffic service (e.g., multicast IPTV service) while other contexts are configured for that service provider for other services. It should be understood that multiple multicast traffic service contexts may exist on the multicast edge network element for one or more service providers. For example, a service provider may have a multicast traffic service context that includes support for resilient multicast traffic processing, and a separate multicast traffic service context that does not include the resilient multicast traffic processing capability (e.g., premium subscribers may be bound to the resilient multicast traffic service context while non-premium subscribers may be bound to the non-resilient multicast traffic service context). For example, the multicast receiver 190 is bound to a resilient multicast traffic service context.

According to one embodiment of the invention, an administrator configures the secondary interface (e.g., interface 165) for resilient multicast traffic processing, as described previously, for the resilient multicast traffic service context. For example, a multicast traffic service context configured for resilient multicast traffic processing may include the interfaces 160, 165, and 170. Also included in the resilient multicast traffic service context is an implementation of the unicast routing protocol module 340 (e.g., other contexts may have their own implementation of the unicast routing protocol module 340), an implementation of the PIM module 342, the command line interface module 344, the multicast failure detection module 312, the RPF interface list 314, an implementation of the MRIB (multicast routing information base) 316, the multicast state(s) 318, 330A-330C, the MFIB (multicast forwarding information base) 324A-C, the assert list 328A-328B, and the outgoing interface list(s) 320, 326A-326C.

Separating the multicast edge network element 150 into one or more contexts, including at least one multicast traffic service context, allows the implementation of resilient multicast traffic processing of the multicast edge network element 150 to guarantee multicast traffic processing for only the last hop of multicast traffic for each resilient multicast traffic service context, and not to necessarily guarantee the last hop of other types and/or classes of traffic being received on those links (e.g., 115A and 115B). For example, separate and apart from the multicast traffic, unicast traffic may be flowing on the communication links 115A and 115B (e.g., the unicast traffic belongs to a context other than the multicast traffic service context, and the unicast traffic may be different on each of those links). Thus, the multicast edge network element 150 does not necessarily guarantee the last hop of traffic not associated with the multicast traffic service context(s). This allows the multicast edge network element to conserve resources (e.g., bandwidth, processing, memory, etc.) where a local recovery is not desired or needed (e.g., where a certain amount of delay is acceptable in case of failure) and independently provide that protection where needed and/or configured (e.g., multicast IPTV services).

As another example, according to one embodiment of the invention, the implementation of resilient multicast traffic processing of the multicast edge network element 150 guarantees multicast traffic stream processing for only the last hop of multicast traffic for a resilient multicast traffic service context and does not guarantee multicast traffic stream processing of the last hop for a non-resilient multicast traffic service context. Thus, subscribers bound to a resilient multicast traffic service context (e.g., premium subscribers) may experience less of a delay in service upon a failure in the last hop as compared to subscribers bound to a non-resilient multicast traffic service context (e.g., non-premium subscribers) upon a failure in the last hop (e.g., the resilient multicast traffic service context performs a local recovery as described previously herein, and the non-resilient multicast traffic service context performs a standard multicast recovery as described in the prior art). Thus, the multicast edge network element 150 may conserve resources (e.g., bandwidth, processing, memory, etc.) by guaranteeing the last hop of multicast traffic for only certain ones of the multicast traffic service context(s) while performing a standard recovery for other ones of the multicast traffic service context(s).

Additionally, while the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A computer implemented method of minimizing packet loss of multicast traffic stream when a failure occurs in a network including a multicast edge network element, wherein the multicast edge network element is coupled with a first and second multicast core network element each capable of forwarding packets of an equivalent multicast traffic stream to the multicast edge network element and each is situated between a source of the multicast traffic stream and the multicast edge network element, the method comprising:

separately joining an equivalent multicast traffic stream through a first and a second path between the multicast edge network element and the first and second multicast core network element respectively, wherein separately joining the equivalent multicast traffic stream includes:

transmitting a first message for joining the equivalent multicast traffic stream through the first path, transmitting a second message for joining the equivalent multicast traffic stream through the second path, and wherein the first message and the second message cause the multicast edge network element to receive packets of the equivalent multicast traffic stream through the first path while simultaneously receiving packets of the equivalent multicast traffic stream through the second path;

processing the packets of the equivalent multicast traffic stream received through the first path from the first multicast core network element, and while those packets are received uninterrupted through the first path, discarding the packets of the equivalent multicast traffic stream received through the second path from the second multicast core network element; and upon detection of a failure in the first path, transitioning to processing the packets of the equivalent multicast traffic stream subsequently being received through the second path from the second multicast core network element.

2. The computer implemented method of claim 1, wherein separately joining includes automatically selecting a first interface coupled with the first multicast core network element according to a unicast routing protocol at which packets are received and selecting a second interface separate from the first interface, wherein the second interface is coupled with the second core multicast network element creating node disjointness of the last hop of the equivalent multicast traffic stream to the multicast edge network element, and wherein the second core multicast network element uses its unicast routing protocol to determine its best route towards the source of the multicast traffic stream, wherein the first path and the second path are guaranteed to be different only for the last hop to the multicast edge network element.

3. The computer implemented method of claim 2, wherein the processing of the packets of the equivalent multicast traffic stream received through the first path from the first multicast core network element, is performed based on the determination that the packets are received at the first interface.

4. The computer implemented method of claim 1, wherein transitioning to processing the packets of the equivalent multicast traffic stream being received through the second path is performed in less than 50 milliseconds.

5. The computer implemented method of claim 1, further comprising,
determining that a best route towards the source of the multicast traffic stream, according to a unicast routing protocol, is through a third path including a third multicast core network element, wherein the third multicast core network element is able to forward equivalent packets of the multicast traffic stream to the multicast edge network element and is situated between the source of the multicast traffic stream and the multicast edge network element;
adding a third interface of the multicast edge network element to an outgoing interface list;
joining the equivalent multicast traffic stream through the third path, including the third interface, between the multicast edge network element and the third multicast core network element; and
upon receiving packets of the multicast traffic stream through the third path from the third multicast core network element, transitioning to performing the following,
processing the packets of the multicast traffic stream received through the third path from the third multicast core network element, and
discarding the packets of the multicast traffic stream being received through the second path from the second multicast core network element.

6. The computer implemented method of claim 5, further comprising removing the third interface from the outgoing interface list upon transitioning to processing the packets of the multicast traffic stream received through the third path from the third multicast core network element.

7. The computer implemented method of claim 5, wherein the third multicast core network element and the first multicast core network element are the same multicast core network element.

8. The computer implemented method of claim 1, wherein the multicast edge network element detects the failure in the first path through use of a communication link failure notification or a drop in a rate of receipt of multicast traffic below a configured threshold.

9. A multicast edge network element comprising:
an interface manager module to automatically configure a first interface of a first path with a best route towards a source of an equivalent multicast traffic stream as determined by a unicast routing protocol module, and to configure a second interface of a second path as a backup interface;
a protocol independent multicast (PIM) module coupled with the first and second interface, the PIM module to cause the multicast edge network element to join the equivalent multicast traffic stream through the first path, which includes transmitting a first message for joining the equivalent multicast traffic stream and to separately join the equivalent multicast traffic stream through the second path, which includes transmitting a second message for joining the equivalent multicast traffic stream, and wherein transmitting the first message and the second message cause the multicast edge network element to receive packets of the equivalent multicast traffic stream through the first and the second path simultaneously;
a multicast traffic stream failure detection module coupled with the first and second interface, the multicast traffic stream failure detection module to detect one or more failure in the first path; and
a manager coupled with the multicast traffic stream failure detection module and the first and second interface, the manager to,
cause packets of the equivalent multicast traffic stream that are to be received through the first path to be processed and the packets of the equivalent multicast traffic stream that are to be received from the second path to be dropped while those packets are received through the first path uninterrupted, and
cause a transition to process the packets of the equivalent multicast traffic stream that are to be received through the second path if the multicast traffic stream failure detection module detects a failure in the first path.

10. The multicast edge network element of claim 9, further comprising the interface manager to couple the first and second interface with a first and second multicast core network element respectively to create node disjointness of the last hop of the equivalent multicast traffic streams to the multicast edge network element, wherein the second core network element is to use its unicast routing protocol to determine its best route to a source of the multicast traffic stream.

11. The multicast edge network element of claim 9, wherein the manager is to cause the transition in less than 50 milliseconds.

12. The multicast edge network element of claim 9, further comprising:
the interface manager to automatically configure a third interface with a best route towards the multicast source as determined by the unicast routing protocol module, and to add the third interface to an outgoing interface list;
the PIM module to cause to multicast edge network element to join an equivalent multicast traffic stream through the third interface; and
the line manager further to cause packets of the equivalent multicast traffic stream that are to be received at the third interface to be processed and to cause the packets of the equivalent multicast traffic stream that are to be received from the second path to be dropped.

13. The multicast edge network element of claim 9, wherein the multicast traffic stream failure detection module is to detect interruptions of the multicast traffic stream with use of a communication link failure notification.

14. A non-transitory machine-readable medium that provides instructions that, when executed by a processor, will cause said processor to perform operations for minimizing packet loss of multicast traffic stream when a failure occurs in a network including a multicast edge network element, wherein the multicast edge network element is coupled with a first and second multicast core network element each capable of forwarding packets of an equivalent multicast traffic stream to the multicast edge network element and each is situated between a source of the multicast traffic stream and the multicast edge network element, comprising:

separately joining the equivalent multicast traffic stream through a first and a second path between the multicast edge network element and the first and second multicast core network element respectively, wherein separately joining the equivalent multicast traffic stream includes:

transmitting a first message for joining the equivalent multicast traffic stream through the first path,         transmitting a second message for joining the equivalent multicast traffic stream through the second path, and         wherein the first message and the second message cause the multicast edge network element to receive packets of the equivalent multicast traffic stream through the first path while simultaneously receiving packets of the equivalent multicast traffic stream through the second path;

processing the packets of the equivalent multicast traffic stream received through the first path from the first multicast core network element, and while those packets are received uninterrupted through the first path, discarding the packets of the equivalent multicast traffic stream received through the second path from the second multicast core network element; and     upon detection of a failure in the first path, transitioning to processing the packets of the equivalent multicast traffic stream subsequently being received through the second path from the second multicast core network element.

15. The non-transitory machine-readable medium of claim 14, wherein separately joining includes automatically selecting a first interface coupled with the first multicast core network element according to a unicast routing protocol at which packets are received and selecting a second interface separate from the first interface, wherein the second interface is coupled with the second core multicast network element creating node disjointness of the last hop of the equivalent multicast traffic stream to the multicast edge network element, and wherein the second core multicast network element uses its unicast routing protocol to determine its best route towards the source of the multicast traffic stream, wherein the first path and the second path are guaranteed to be different only for the last hop to the multicast edge network element.

16. The non-transitory machine-readable medium of claim 15, wherein the processing of the packets of the equivalent multicast traffic stream received through the first path from the first multicast core network element, is performed based on the determination that the packets are received at the first interface.

17. The non-transitory machine-readable medium of claim 14, wherein transitioning to processing the packets of the equivalent multicast traffic stream being received through the second path is performed in less than 50 milliseconds.

18. The non-transitory machine-readable medium of claim 14, further comprising, determining that a best route towards the source of the multicast traffic stream, according to a unicast routing protocol, is through a third path including third multicast core network element, wherein the third multicast core network element is able to forward equivalent packets of the multicast traffic stream to the multicast edge network element and is situated between the source of the multicast traffic stream and the multicast edge network element;

adding a third interface of the multicast edge network element to an outgoing interface list;

joining the equivalent multicast traffic stream through the third path, including the third interface, between the multicast edge network element and the third multicast core network element; and     upon receiving packets of the multicast traffic stream through the third path from the third multicast core network element, transitioning to performing the following,         processing the packets of the multicast traffic stream received through the third path from the third multicast core network element, and         discarding the packets of the multicast traffic stream being received through the second path from the second multicast core network element.

19. The non-transitory machine-readable medium of claim 18, further comprising removing the third interface from the outgoing interface list upon transitioning to processing the packets of the multicast traffic stream received through the third path from the third multicast core network element.

20. The non-transitory machine-readable medium of claim 18, wherein the third multicast core network element and the first multicast core network element are the same multicast core network element.

21. The non-transitory machine-readable medium of claim 14, wherein the multicast edge network element detects the interruption of the multicast traffic through use of a communication link failure notification or a drop in a rate of receipt of multicast traffic below a configured threshold.

* * * * *